Dec. 19, 1939.   G. E. SCHWARZ   2,184,087
COMPOSITE PACKING MATERIAL
Filed April 22, 1939
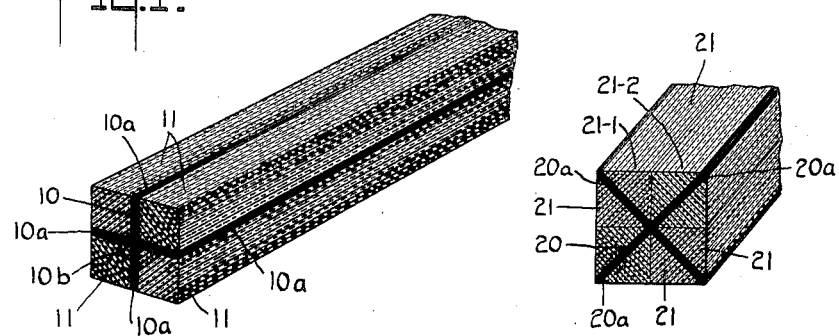
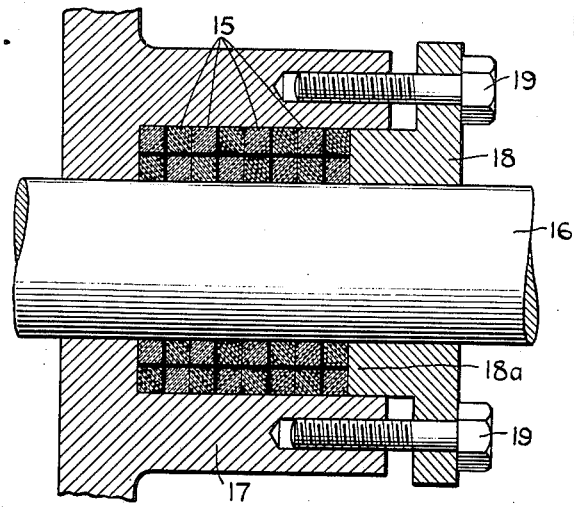
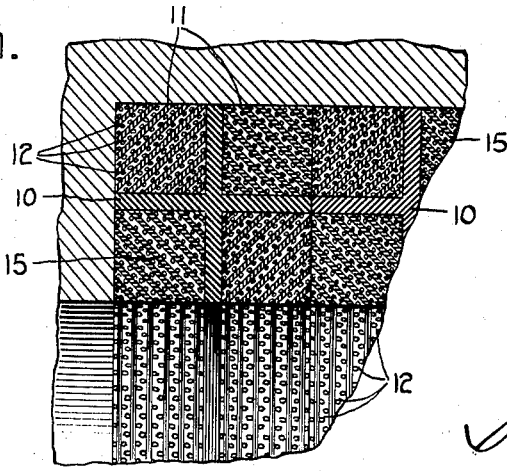
INVENTOR
Gustav E. Schwarz
BY
Henry J. Lucke
HIS ATTORNEY Patented Dec. 19, 1939

2,184,087

UNITED STATES PATENT OFFICE 2,184,087

COMPOSITE PACKING MATERIAL

Gustav E. Schwarz, Hempstead, N. Y.

Application April 22, 1939, Serial No. 269,551

6 Claims. (Cl. 288—18)

This invention relates to packing material of the type utilized in association with plunger rods, rotating shafts, and the like, for providing a substantially fluid tight seal.

The invention is particularly concerned with packing material of the above type which includes, within the body thereof, flexible resilient portions for improving the sealing action and compensating for wear of the rods or shafts.

Packing material of the type concerned is usually prepared in strip form for insertion within what is commonly called a "stuffing box". The rod or shaft extends through the stuffing box and, thus, is enabled to move within zones containing fluids, while the fluid is prevented from escaping. Often, as in the case of reciprocating piston rods in steam engines, the fluid is confined under considerable pressure in a chamber. Accordingly, it is imperative that the seal be maintained substantially fluid tight.

Heretofore it has been difficult to obtain packing material of symmetrical construction and having sufficient flexibility and resilience to compensate adequately for wear or scoring of the shaft. Frequent repacking of the stuffing box and replacement of packing material therein has been necessary.

A primary object of the present invention is to provide packing material which inherently contains such flexibility and resiliency as to tightly hug the shaft regardless of normal surface irregularities thereof caused by wear.

An object is to provide packing material, having the above qualities of flexibility and resilience, which is of symmetrical construction affording a plurality of peripheral friction surfaces, each with similar flexible resilient spring backing.

An object is to provide a packing material which will reduce friction against the moving surface of the shaft to a minimum.

An object is to provide packing material which is relatively simple and inexpensive to manufacture, and which will satisfactorily perform its intended function over long periods of use, thus requiring replacement at but infrequent intervals.

An outstanding feature of the invention is the provision of a flexible resilient skeleton structure, about which individual sections of packing material are arranged in such manner as to be, substantially in entirety, resiliently supported.

It is preferred to form the flexible resilient skeleton structure as an integral fluted core having deep flutes into which are bonded sections, respectively, of laminated packing material, thus producing a composite entity presenting peripheral friction surfaces. It is most advantageous to form the flexible resilient skeleton structure as a fluted strip whose right section taken transversely of the length is a right-angled cross having arms of equal extension; and to complete the formation of the composite packing strip by bonding into the four right-angled recesses between the arms of the cross, four individual square sections of a laminated packing material. Thus, each individual section of laminated packing material has two adjacent faces exposed as friction surfaces, and two adjacent faces bonded to and backed by angularly related flexible resilient cushioning layers, the resulting composite packing material being of symmetrical construction. The laminations of the individual sections preferably extend diagonally relative to the peripheries of the squares, and, to reduce frictional resistance without impairing the sealing function, the adjacent individual sections are advantageously placed so that the diagonal laminations, in cross section, form a "herringbone".

In the drawing:

Fig. 1 illustrates, in perspective, a fragmentary length of composite packing strip representing a preferred embodiment of the invention.

Fig. 2 illustrates a vertical central section taken through a conventional type of stuffing box packed with the composite packing strip material of Fig. 1.

Fig. 3 represents an enlarged fragmentary portion of Fig. 2 with the shaft removed to reveal longitudinal friction surfaces of the composite packing strips.

Fig. 4 illustrates, in enlarged perspective, a fragmentary length of composite packing strip representing another embodiment of the invention.

The flexible resilient skeleton is intended to resiliently cushion each section of packing material proper from the remaining sections, thus in effect, providing individual springing for each section and resiliently urging the particular sections concerned against the moving surface of the plunger or rod when the packing material is in use.

Accordingly, the flexible resilient skeleton may be of any form which will effectively accomplish this purpose.

It is preferable that the composite strip of packing material be symmetrical in construction in order to enable use of each of the peripheral surfaces of the strip as a friction surface.

A most advantageous form of the invention is illustrated in Figs. 1, 2 and 3, the flexible resilient skeleton, designated 10, being in the form of a fluted core of a length coextensive with the desired length of the composite packing material. In the particular instance, the fluted skeleton core 10 has a configuration which, in right section taken transversely of the length thereof, forms substantially a cross having four right-angled flutes and having four arms, each indicated 10a, extending substantially equally and radially from a central core 10b.

The fluted skeleton core may be formed in any suitable manner from any type of flexible resilient material found suitable for the purpose, but preferably is integrally molded from rubber. Various types of rubber commonly employed in packing materials may be utilized, as well as synthetic rubber, such as the commercial products "Neoprene", "Thickol" and "Duprene". In fact, it is preferred that one of these synthetic products be used for they have the desired flexible resilient qualities as well as being very durable under operating conditions to which packing material is exposed.

The instant embodiment of composite packing material is produced as an entity, in itself, by bonding, into the flutes of the flexible resilient fluted skeleton core 10, appropriately configurated and dimensioned individual lengths or sections, each indicated 11, of laminated packing material. The sections 11 are preferably prepared in a manner which is customary in the art, that is, by laminating sheets of cotton duck, or other material such as asbestos fabric, with friction rubber or other suitable flexible bonding medium.

In the present instance the sections 11 are square in right section taken transversely across the length thereof, and, it is preferred that the individual laminations 12, of cotton duck or the like, be disposed diagonally with respect to the peripheral boundary of the square. The central lamination 12 may coincide with a diagonal of the square and the other laminations may be disposed parallel thereto.

For reducing friction to a minimum, individual sections 11 are preferably so placed with respect to one another that the diagonally laminated structure of one will form a "herringbone" pattern—considered along the right transverse section—with the two immediately adjacent thereto. Thus, merely the edges of the laminations will collectively form the friction surfaces of the composite packing strip, and the laminations themselves, of adjacent sections, will be angularly related in a most advantageous manner.

The flexible resilient fluted skeleton core 10 and the individual sections 11 of packing material may be vulcanized as a unit to form the composite packing material strip, or may be united in any manner found desirable.

The individual sections 11 may be dimensioned so that their friction surfaces extend slightly beyond the terminal ends of the arms 10a of the skeleton core 10, or so that they are flush therewith. In certain instances, the arms 10a may be tapered inwardly or outwardly as respects the central core 10b, but, in most instances will be of substantially equal thickness both throughout their lengths and one relative to the others, the thickness being in all cases sufficient to afford a springy cushioning action. The central core 10b is preferably solid and of a configuration resulting naturally from the intersection of the two sheet formations which provide the arms 10a, but, in certain instances, may be made hollow and/or enlarged as found desirable.

Composite packing strips of the type aforedescribed are illustrated in Figs. 2 and 3 in side-by-side placement within a stuffing box which surrounds a plunger or shaft. The composite packing strips are designated 15, and the rod or shaft 16. The stuffing box is of conventional construction comprising a cylindrical chambered portion 17 having a cover 18 adjustably secured thereto as by means of the machine screws 19. The cover 18 has an angular shoulder portion 18a which slides within the cylindrical chamber of the portion 17 and serves to exert lateral pressure against the laterally aligned composite packing strips 15, in any degree found desirable, by the tightening of the machine screws 19.

It should be noted that the composite packing strips 15 are symmetrical in construction, that is, may be disposed within the stuffing box with any one of the peripheral faces in friction contact with the circumferential surface of the rod or shaft 16. Exactly the same flexible resilient springing effect will be had, so far as the circumferential surface of the rod or shaft is concerned, regardless of which of the peripheral surfaces makes the friction contact. Thus, each of the peripheral surfaces may be employed as a friction surface for prolonging the length of life of the packing material strip.

Another embodiment of composite packing strip pursuant to the invention is illustrated in Fig. 4. In this instance the flexible resilient fluted skeleton core, designated 20 is also of right-angled cross formation in right section taken transversely across its length, but it is disposed in such manner in the composite packing strip that it coincides with the diagonals of the square formed by the periphery of the transverse right section of the composite packing material strip per se. The individual sections of packing material, each designated 21, have right transverse sections of isosceles triangle formation, and are fitted into the respective flutes of the skeleton core 20 with the right-angles coinciding with the right angular formation of the flutes.

For providing the "herringbone" pattern, each section 21 of packing material may comprise two sub-sections 21—1 and 21—2, the laminations of the sub-sections running approximately parallel with or perpendicular to the respective adjacent arm 20a of the fluted skeleton core 20. The sub-sections 21—1 and 21—2 of each section 21 may be bonded together by a suitable flexible bonding medium such as friction rubber.

Other embodiments coming within the generic purview of the invention will be readily apparent, without illustration, to those skilled in the art. For instance, one of the arms 10a of the fluted skeleton core 10 of the embodiment of Figs. 1, 2 and 3 may be eliminated. The packing strip will not then be symmetrical, but certain of the advantages of the invention will be had. Also, a single composite packing strip may be formed by utilizing an integral fluted core of the kind that would be produced by uniting the contiguous arms of the laterally adjacent packing strips 15 in Figs. 2 and 3, with or without additional arms at the locations at which the faces of the laterally adjacent packing strips are contiguous.

In certain instances, it may be desirable to pack a stuffing box in the manner illustrated in Fig. 2, but utilizing the component elements of the composite packing strip 15 as separate individual elements. Under these conditions, the individual laminated sections 11 might be laid into the flutes of the fluted skeleton core without being bonded thereto. Accordingly, the individual sections 11, having faces contiguous with the circumferential surface of the rod or shaft, would be urged toward the shaft without lateral retardation.

While it is advantageous to employ laminated packing material as the packing material proper, it is within the purview of the invention to employ any other type of packing material that might now be in general use or that might be developed in the future, in connection with a flexible resilient skeleton for the attainment of the major objectives of the invention.

Whereas this invention has been illustrated and described with respect to preferred embodiments thereof, it should be clearly understood that changes may be made without departing from the generic scope of the invention as set forth herein and in the claims that follow.

I claim:

1. Composite packing material in strip form comprising a fluted skeleton structure of flexible resilient material, having flute-defining arms of substantially uniform thickness throughout the said fluted skeleton structure having a substantially cross-shaped configuration in right section taken transversely of its length, and packing material bonded into the flutes of said fluted skeleton structure, said fluted skeleton structure and said packing material being substantially coextensive lengthwise, and the said packing material within any one flute being completely separated, by said fluted skeleton structure, from the said packing material in the other flutes.

2. Composite packing material, comprising a fluted skeleton structure of flexible resilient material having a substantially cross-shaped configuration in right section taken transversely of the length thereof, and individual lengths of packing material disposed, respectively, within the flutes formed between the arms of the said cross-shaped configuration, said individual lengths of packing material filling the flutes of the fluted skeleton structure and providing peripheral friction surfaces for the composite packing material.

3. Composite packing material comprising a fluted skeleton structure of flexible resilient material having a substantially cross-shaped configuration in right section taken transversely of the length thereof, and individual lengths of laminated packing material disposed, respectively, within the flutes formed between the arms of the said cross-shaped configuration, said individual lengths of laminated packing material filling the flutes of the fluted skeleton structure and providing peripheral friction surfaces for the composite packing material, and the laminations of said individual lengths being so arranged, and the individual lengths themselves being so arranged relative to one another in the composite packing material, that adjacent individual lengths will form a herringbone pattern in right section taken transversely of the length of the composite packing material.

4. Composite packing material comprising a fluted skeleton structure of flexible resilient material, said core having a right-angled cross-shaped configuration in right section taken transversely of the length thereof, and having arms of substantially equal extension and equal thickness throughout, and individual lengths of packing material disposed respectively, in the right-angled flutes formed between the arms of the cross-shaped configuration of the fluted skeleton structure, said individual lengths each being substantially square in right section taken transversely of the length thereof and having sides which are substantially equal in length to the extensions of the said arms of the fluted skeleton structure, the composite packing material thereby formed being substantially square in right section taken transversely of the length thereof.

5. Composite packing material comprising a fluted skeleton structure of flexible resilient material, said core having a right-angled cross-shaped configuration in right section taken transversely of the length thereof and having arms of substantially equal extension and equal thickness throughout, and individual lengths of laminated packing material disposed, respectively, in the right-angled flutes formed between the arms of the cross-configuration of the fluted skeleton structure, said individual lengths each being substantially square in right section taken transversely of the length thereof, and having sides which are substantially equal in length to the extension of the said arms of the fluted skeleton structure, the composite packing material thereby formed being substantially square in right section taken transversely of the length thereof, and the laminations of the said individual lengths being so arranged, and the said individual lengths themselves being so arranged relative to one another, that the laminations of adjacent individual lengths will form a herringbone pattern in right section taken transversely of the length of the composite packing material.

6. Composite packing material having a rectangular configuration in right section taken tranversely of the length thereof, which comprises a fluted skeleton structure of flexible resilient material having a cross-shaped configuration in right section taken transversely of the length thereof, the arms of said structure forming diagonals of the said rectangularly configurated cross-section of the composite packing material strip, and packing material filling the flutes between the said arms of the structure, the packing material in the flute between any two adjacent arms comprising two similar strip lengths of laminated packing material flexibly bonded together along approximately the longitudinal center of the flute, the laminations of the individual strip lengths being so arranged, and the said two strip lengths being so arranged relative to each other that the laminations form a herringbone pattern in right section taken transversely of the length of the composite packing material.

GUSTAV E. SCHWARZ.